Dec. 31, 1929. W. E. WINE Re. 17,542

BODY BOLSTER

Original Filed May 6, 1927 2 Sheets-Sheet 1

Inventor

William E. Wine

By Ritter & Mechlin his Attorneys

Dec. 31, 1929. W. E. WINE Re. 17,542

BODY BOLSTER

Original Filed May 6, 1927 2 Sheets-Sheet 2

Inventor

William E. Wine

By Potter & Meehlin his Attorneys

Reissued Dec. 31, 1929 Re. 17,542

UNITED STATES PATENT OFFICE

WILLIAM E. WINE, OF TOLEDO, OHIO, ASSIGNOR TO WINE RAILWAY APPLIANCE COMPANY, OF TOLEDO, OHIO, A CORPORATION OF OHIO

BODY BOLSTER

Original application filed May 6, 1927, Serial No. 146,977, Patent No. 1,703,756, dated February 26, 1929. Divided and application filed November 21, 1927, Serial No. 234,740, Patent No. 1,703,758, dated February 26, 1929. Application for reissue filed September 17, 1929. Serial No. 393,256.

This invention relates to new and useful improvements in body bolsters and the present application is for a reissue of Patent No. 1,703,758, the application for which was a division of the application which eventuated in Patent No. 1,703,756 dated February 26, 1929.

A primary object of the invention is to provide a body bolster of novel form and of maximum strength which may be easily manufactured and associated with adjoining parts of the car construction.

A principal feature of the invention consists in constructing a body bolster of three main plates which are rigidly connected by reinforcing members disposed on opposite sides of and connected to the car center sill.

Another feature of the invention resides in providing the bolster with three main plates, one of which is disposed above and secured to the center sill and the other two of which are spaced from and disposed on opposite sides of the center sill, means being employed for rigidly tying the plates together.

A further feature of the invention consists in providing the body bolster with a plurality of reinforcing members positioned adjacent the points of attachment of the side bearing wear plates.

A still further feature of the invention consists in forming the ends of the bolster so that car side stakes may be conveniently and rigidly attached thereto.

Other and more specific features of the invention residing in advantageous forms, combinations and relations of parts will hereinafter appear and be pointed out in the claims.

In the drawings illustrating a preferred embodiment of the invention:

Figure 1:
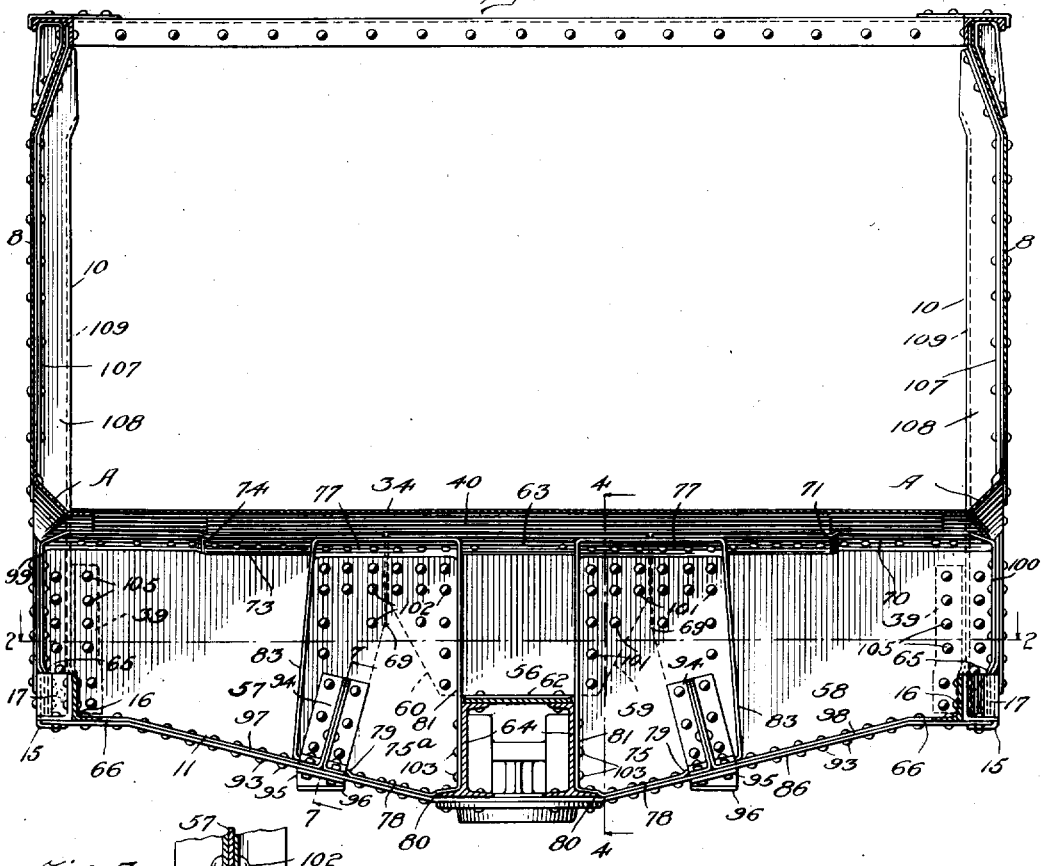
Figure 1 is a transverse sectional view of a railway hopper car embodying the invention, the body bolster being shown in elevation.
Figure 7:
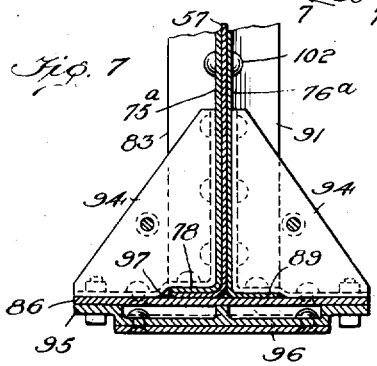
Figure 7 is an enlarged fragmentary view taken on line 7—7, Figure 1.
Figure 9:
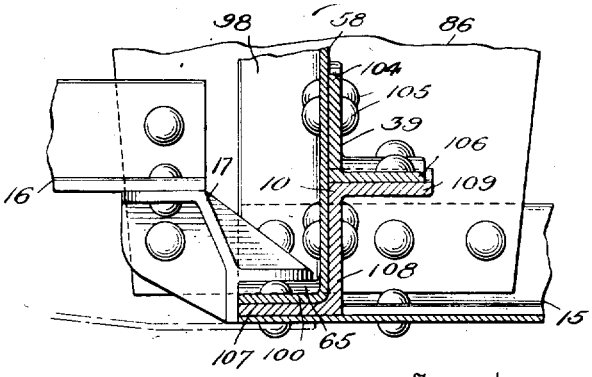
Figure 9 is an enlarged sectional view adjacent one end of the bolster.
Figure 8:
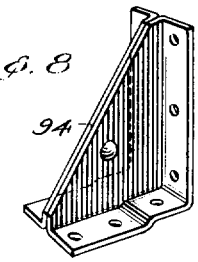
Figure 8 is a perspective view of one of the braces secured to the bolster adjacent the side bearing wear plates.
Figure 2:
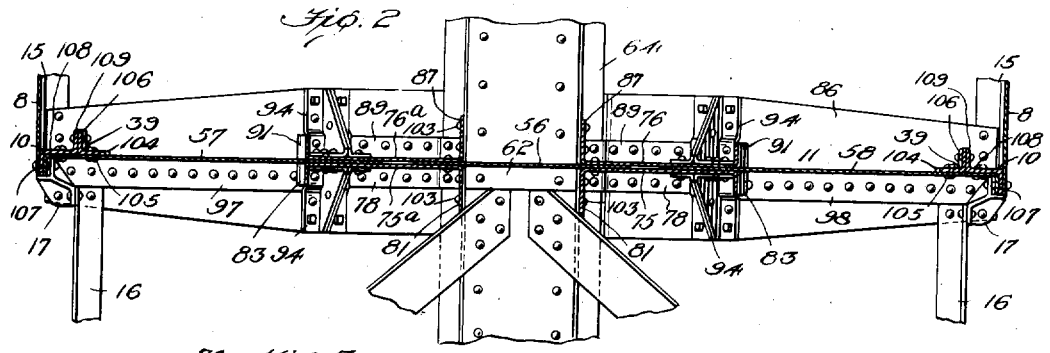
Figure 2 is a sectional view taken on line 2—2, Figure 1.
Figure 3:
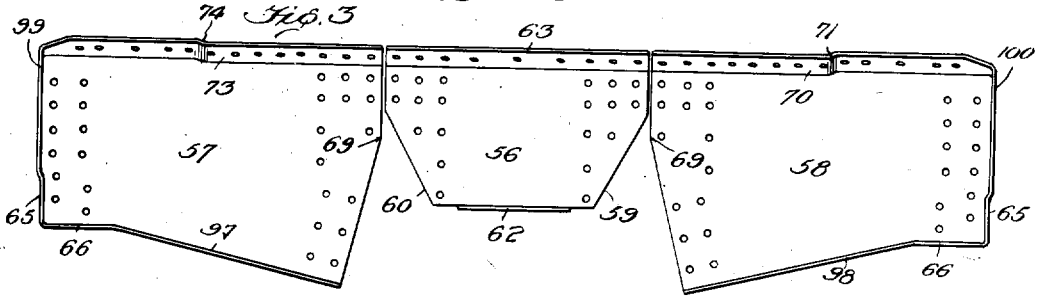
Figure 3 is a side elevational view of the main plates of the bolster in their assembled positions.
Figure 4:
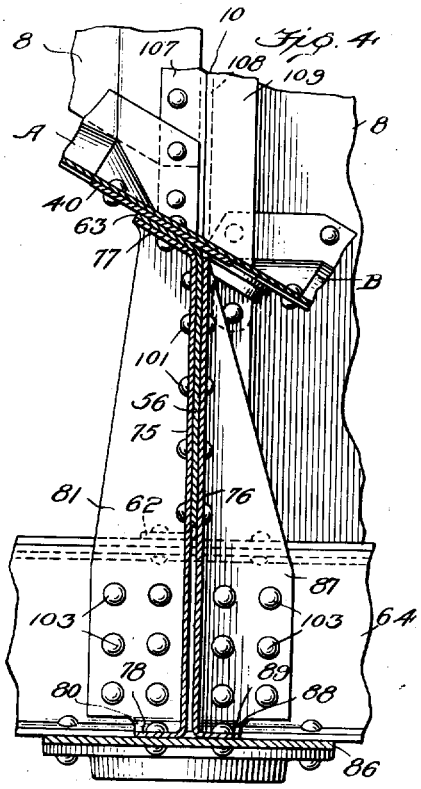
Figure 4 is a sectional view on line 4—4, Figure 1.
Figure 5:
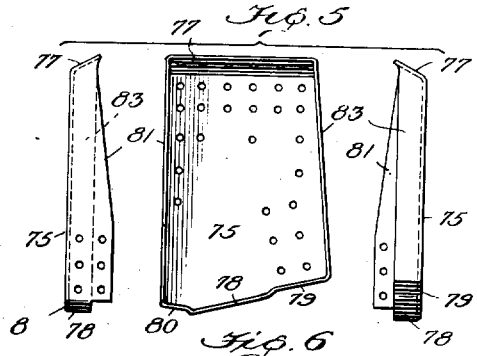
Figure 5 illustrates side and end views of one of the reinforcing plates applied to one side of the bolster.
Figure 6:
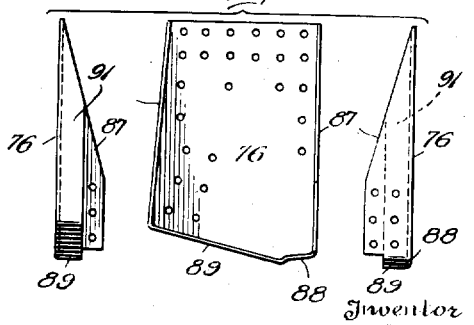
Figure 6 illustrates similar views of one of the reinforcing plates applied to the opposite side of the bolster.

The car chosen for purposes of illustrating the invention is described in detail in my Patent No. 1,703,756, dated February 26, 1929. Generally, it may be said to comprise a center sill 64 and side sills 15. As the car illustrated is of the maximum capacity type having reduced ends, the side sills 15 respectively terminate adjacent the body bolsters 11 of the car. Intermediate the bolsters and the adjacent ends of the car the side sills comprise angle shaped members 16 which are rigidly secured to the sills 15 and to the bolsters 11 by brackets 17.

As the body bolsters adjacent each end of the car are identical in construction and function, only one has been illustrated in the drawings and will be described in the specification.

The bolster generally comprises three main plates, namely, a center plate 56 and two end plates 57 and 58, respectively. The center plate 56 is positioned above and overlies the center sill 64, being provided with a lower or bottom flange 62 for attachment to the latter and with an upper or top flange 63 adapted to supportingly cooperate with the inclined floor 34 of the car. For a purpose to be hereinafter described, the upper portion of the center plate projects on opposite sides of the center sill and its side edges may conveniently converge downwardly, as at 59 and 60, respectively, from adjacent its upper portion to adjacent its lower edge or top of the center sill.

The end plates 57 and 58 which are disposed on opposite sides of the center sill are respectively provided with top flanges 73 and 70, which, when the plates are in their proper assembled positions, register with and constitute continuations of the top flange 63 of the center plate. The top flanges of the main plates, as they are primarily adapted to supportingly cooperate with the inclined floor 34, are inclined so as to lie in a plane parallel with the latter. The end plates are so proportioned that they do not overlap adjacent portions of the center plate, but the inner edges thereof are disposed contiguous to the outer edges of the center plate. The inner edges of the end plates diverge downwardly from adjacent a point 69 somewhat below the points of convergence of the side edges of the center plate to adjacent their bottom edges. The lower or bottom edges of the end plates are preferably formed with flanges 97 and 98 which respectively project from the main body portions of the plates in the same direction as the upper flanges 70 and 73. These bottom flanges incline upwardly and outwardly from the lower inner edges of the plates to points 66 adjacent the ends of the bolster, from which points they extend in substantially horizontal planes. At their outer ends the top and bottom flanges of the plates 57 and 58 are respectively connected by end or side flanges 99 and 100 which serve as convenient means for attaching adjoining portions of the car construction to the bolster. At their lower portions the end flanges are offset inwardly, as at 65, to receive adjoining portions of the side sills 15.

For connecting the main bolster plates and for rigidly attaching the bolster as a whole to the center sill two sets of reinforcing plates are preferably employed, one set comprising the plates 75 and 75ª and the other the plates 76 and 76ª. The plates 75 and 76 are disposed on one side of the center sill and respectively overlap adjacent portions of the center plate 56 and the end plate 58, being rigidly secured to each by rivets 101. The plates 75ª and 76ª are disposed on the opposite side of the center sill and respectively overlap opposite sides of adjacent portions of the center plate 56 and the end plate 57, being rigidly secured to each by rivets 102.

The plates 75 and 75ª are respectively provided with inner and outer side flanges 81 and 83, the latter being inclined slightly inwardly. The inner flanges 81 are disposed in substantially vertical planes and are of increased width or depth at their lower portions so as to be rigidly secured by rivets 103 to the adjacent sides of the center sill. These plates are also provided with upper and lower flanges 77 and 78, respectively, the former being secured to the underside of adjacent portions of the inclined top flanges 63, 70 and 73 of the main plates. The main portions of the lower flanges 78 are respectively disposed in the same planes as and constitute continuations of adjacent portions of the lower flanges 97 and 98 of the end plates 57 and 58, respectively. At their outer ends the flanges 78 are preferably offset somewhat upwardly, as at 79, to overlap and be secured to the upper surfaces of the bottom flanges 97 and 98, while at their inner ends they are offset, as at 80, to conform to the contour of the bottom portions of the center sill. It will thus be perceived that the plates 75 and 75ª, in addition to serving to rigidly connect the main plates of the bolster, rigidly tie the bolster as a whole to the center sill.

The other set of reinforcing plates 76 and 76ª are of a construction similar to the plates 75 and 75ª and each is provided with side flanges 87 and 91, the former being the one adapted to be rigidly secured to the adjacent side of the center sill. These plates are also formed with bottom flanges 89 which are respectively disposed in planes parallel with the inclined bottom flanges 97 and 98 of the end plates. At their inner ends the flanges 89 are preferably provided with offset portions 88 which conform to the contour of the bottom portions of the center sill. As these plates overlap the faces of the main plates opposite to the one from which the upper flanges 63, 70 and 73 project, they are not formed with top flanges, as are the plates 75 and 75ª.

The main plates and the reinforcing plates of the bolster may be additionally conveniently and advantageously connected and tied together by plates 40 and 86. The plate 40 is overlappingly secured to the top flanges of the main plates and reinforcing plates and is preferably of sufficient width to project on opposite sides of the top flanges. Since it has been found desirable to terminate this top plate inwardly of the ends of the bolster the flanges 70 and 73 of the end plates are offset, as at 71 and 74, respectively, so that the upper surface of the plate is disposed in the same plane as the upper surfaces of those portions of the flanges 70 and 73 which it does not overlap. The plate 86 extends from one end of the bolster to the other beneath the center sill, being rigidly secured to the underside of the bottom flanges 97 and 98 of the end plates and the flanges 78 and 89 of the reinforcing plates by rivets 93. From the foregoing it will be perceived that while the bolster is of composite form, the parts are so proportioned and designed that they may be secured and rigidly connected to each other and to the center sill and side sills of the car.

Secured to the underside of the bolster on opposite sides of the center sill are plates or bracket members 95, respectively provided with wear plates 96 adapted to cooperate with truck side bearings, not shown. In order to reinforce the bolster at these points a plurality of brackets 94 are preferably employed which are overlappingly secured to opposite faces of the main body portions of the bolster plates and to the upper surfaces of the lower flanges 78 and 89 of the reinforcing plates. In this manner it will be seen that the bolster is provided with a plurality of thicknesses of metal directly over the side bearing wear plates.

Secured to the end plates 57 and 58 inwardly of their outer ends are reinforcing members 39, each of which may advantageously be of angle shape, having a leg 104 secured to the adjacent end plate by rivets 105 and a leg 106 projecting laterally therefrom in a direction opposite to the adjacent end flange. These members, in addition to serving as means for reinforcing the end portions of the bolster, also provide the bolster with additional means to which car side stakes 10 may be attached. These side stakes are preferably of Z-shape and since the sides of the car are spaced apart the maximum distance permitted by railroad standards they project inwardly beyond the car sides. Each of the side stakes has an outer flange 107 secured to the outer face of the adjacent end flange of the bolster, a web portion 108 secured to the main body portion of the adjacent end plate and an inner flange 109 secured to the laterally projecting portion 106 of the adjacent reinforcing member 39. By providing the bolster with a plurality of portions to which the side stakes may be secured it will be perceived that a most rigid car construction is produced and this is particularly desirable inasmuch as substantially the entire lateral support afforded by the car sides for the lading within the car is transmitted to the body bolsters from the side stakes attached thereto.

The side sheets 8 of the car adjoining the bolster may be conveniently overlappingly secured to the outer flanges 107 of the side stakes 10 and any suitable means may be employed, such as angle members, generally designated A and B, for connecting the side sheets 8 and the car floor sheets 34. As is described in detail in my Patent No. 1,703,756, these connecting members A and B may be desirably formed with inclined portions to facilitate the discharge of lading from the car.

The foregoing construction results in a very rigid body bolster and one which may be easily and firmly attached to adjoining portions of the car construction, such as the center sill, the side sills and side stakes.

I claim:

1. A bolster for a freight car comprising two similar end plates and a center plate, said end plates being oppositely arranged with respect to each other, and four plates arranged two on each side of said first mentioned plates for tying them together.

2. A bolster of composite form consisting of a center plate and two end plates, and two plates respectively arranged on one side of said end and center plates for tying them together.

3. A bolster of composite form consisting of a central plate and two like but oppositely arranged end plates, the upper edges of all of said plates being flanged, flanges around the outer and bottom edges of said end plates, and a plurality of flanged plates for tying the central and end plates together.

4. A bolster of composite form comprising a central plate having an inclined top flange and two end plates having top, bottom and side flanges, and reinforcing plates fitting between the top and bottom flanges of said end plates and rigidly secured to the center and end plates.

5. A body bolster comprising a centrally positioned plate and two oppositely arranged end plates, two sets of reinforcing plates arranged on the opposite faces of said first mentioned plates and each set overlapping the center and one of said end plates, flanges on said first mentioned plates and on one set of said reinforcing plates, the flanges of the reinforcing plates being secured to the flanges of the center and end plates.

6. A body bolster comprising a center plate and a right and left hand end plate, a pair of reinforcing plates over-lapping the adjacent ends of the center and respective end plates, the center and end plates being provided with a sloping flange along their upper edges, the reinforcing plates having similar flanges along their upper edges and riveted to the first mentioned flanges, and a strap secured to the lower edges of the end plates and the reinforcing plates.

7. A composite bolster formed of three main plates, the bottom edge of the bolster sloping upwardly from adjacent its center toward its ends, and reinforcing plates on the opposite faces of said plates for tying the three main plates together.

8. A body bolster comprising a centrally located plate and two oppositely arranged end plates, the lower edge of each of said end plates sloping upwardly from adjacent its inner portion to its outer edge, each of said end plates being provided with flanges on its upper, end and lower edges, sets of reinforcing plates spaced from each other and tying the centrally arranged plate and the end plates together, the lower edges of said reinforcing plates being provided with flanges fitting within the lower flanges of said end plates, and additional brackets secured to both of said sets of reinforcing plates.

9. A composite bolster comprising a center plate 56, the end plates 57 and 58, the reinforcing plates 75 and 76, and the like plates 75ᵃ and 76ᵃ and the additional brackets 94.

10. A composite bolster comprising the plates 56, 57 and 58, having the respective upper flanges 63, 73, 70, reinforcing plates 75, 75ᵃ, 76, 76ᵃ, brackets 94 and the lower strap 86.

11. A bolster having wear plates for side bearings, the bolster being formed of three main plates, reinforcing plates arranged on the opposite faces of said bolster plates and overlapping the adjacent edges of said main plates, brackets also secured to said reinforcing plates to provide five thicknesses of metal in cross section directly above the said wear plates.

12. A bolster of composite form consisting of three main plates and two sets of reinforcing plates, each set having one plate with a straight edge at its top and the other plate with a sloping edge, the side edges of said plates converging upwardly.

13. A bolster of composite form consisting of a center and two end plates, two sets of reinforcing plates, each set being riveted to the front and rear faces of the said main plates of the bolster, one plate of each of the reinforcing plates having a sloping upper edge and the other of said plates of both sets extending in a horizontal plane.

14. In a railway hopper car, the combination with a center sill, of a body bolster involving a plurality of plate-like members, one of said members overlying the top of the center sill and being rigidly secured thereto and two of said members being respectively spaced from and disposed on opposite sides of the center sill, and members disposed on opposite sides of the center sill for rigidly connecting said plate-like members, each of said connecting members being provided with upright flanges rigidly secured to the sides of the center sill.

15. In a railway car, the combination with a center sill, of a body bolster involving three plate-like members, one of said members overlying the top of the center sill and being provided with a flange for attachment thereto and the other two of said members being spaced from and disposed on opposite sides of the center sill, each of said plate-like members being formed with an inclined top flange for supporting co-operation with the floor of the car, and members disposed on opposite sides of the center sill for rigidly connecting said plate-like members, each of said connecting members being provided with a plurality of marginal flanges, one of the flanges of each of the connecting members being rigidly secured to the adjacent side of the center sill and another of said flanges being secured to the under side of the top flanges of adjacent plate-like members.

16. In a railway car, the combination with a center sill, of a body bolster involving three plate-like members, each of said members being provided with top and bottom flanges, the top flanges of said members being adapted to supportingly co-operate with the car floor and the bottom flange of one of said members being rigidly secured to the top of the center sill, means passing beneath said center sill and rigidly secured to the bottom flanges of the other of said members, and members disposed on opposite sides of the center sill for rigidly connecting the plate-like members of the bolster, each of said connecting members being provided with a plurality of marginal flanges respectively secured to the top flanges of the plate-like members and to adjacent sides of the center sill.

17. In a railway car, the combination with a center sill, of a body bolster involving three plate-like members, one of said members overlying the top of the center sill and being provided with a flange for attachment thereto and the other of said members being spaced from and disposed on opposite sides of the center sill, and means rigidly connecting said plate-like members involving a plurality of members disposed on opposite sides of the center sill and on opposite sides of the said plate-like members, each of said connecting members being provided with a flange secured to the adjacent side of the center sill and the connecting members on one side of the plate-like members being provided with top flanges rigidly secured to the top flanges of adjacent plate-like members.

18. In a railway car, the combination with a center sill, of a body bolster comprising a center plate and two end plates, said center plate overlying the top of the bolster and projecting on opposite sides thereof and said end plates being spaced from and disposed on opposite sides of the center sill and means rigidly connecting said plates, said means comprising a plurality of members overlappingly engaging adjoining portions of said plates and respectively rigidly secured to opposite sides of the center sill.

19. In a railway car, the combination with a bolster having end flanges and laterally projecting portions adjacent thereto, of side stakes respectively secured to the said end flanges and laterally projecting portions of the bolster.

20. In a railway car, the combination with a body bolster having a web portion and end flanges, said bolster being also provided with laterally projecting portions adjacent the ends thereof, of side stakes rigidly secured to the said laterally projecting portions, the web portion and end flanges of the bolster.

21. In a railway car, the combination with a bolster having a web portion, of a plurality of reinforcing members respectively secured to the bolster adjacent opposite ends thereof, said members each having a portion projecting laterally of the web portion of the bolster, and car side stakes connected to the bolster, said stakes being respectively secured to the web portion of the bolster and to the laterally projecting portions of the said members.

22. In a railway car, the combination with a body bolster having a web portion and end flanges, of car side stakes connected to the bolster and respectively secured to the web portion and side flanges thereof.

23. In a railway car, the combination with a body bolster having end flanges, of reinforcing members respectively secured to the bolster adjacent opposite ends thereof, each of said members having a portion projecting from the bolster in a plane substantially parallel to the said end flanges, and car side stakes connected to the bolster, said stakes being respectively secured to the projecting portions of the said members and to the end flanges of the bolster.

24. In a railway car, the combination with a body bolster having a web portion and end flanges, of reinforcing members respectively secured to the bolster adjacent opposite ends thereof, each of said members having a portion projecting from the bolster in a plane substantially parallel with the said end flanges, and car side stakes connected to the bolster, said stakes being respectively secured to the projecting portions of the members and to the web portion and end flanges of the bolster.

25. In a railway car, the combination with a body bolster having a web portion and end flanges, of reinforcing members respectively secured to the bolster adjacent opposite ends thereof, each of said members having a portion projecting from the bolster in a direction opposite to the said end flanges, and Z shaped side stakes connected to the bolster, said stakes being respectively secured to the projecting portions of the members and to the web portion and end flanges of the bolster.

26. A freight car having in part a center sill, a body bolster comprising three plates, one of which is directly over the center sill, the other of said plates being tied to said center plate, a strap passing from one end of the bolster to the other along its lower edge, and reinforcing brackets secured to said bolster plates and adapted to be positioned directly over side bearing wear plates.

27. A freight car comprising a center sill and a body bolster, the latter being provided on its under surface with side bearing wear plates, reinforcing plates secured to said bolster, and brackets secured to said reinforcing plates and to said wear plates to provide a plurality of thicknesses of metal over the latter.

WILLIAM E. WINE.